United States Patent [19]

Multakh

[11] 4,274,769

[45] Jun. 23, 1981

[54] IMPREGNATED DIAMOND DRILL BIT CONSTRUCTION

[75] Inventor: Leonid Multakh, Scranton, Pa.

[73] Assignees: Acker Drill Company, Inc., Scranton, Pa.; Acker Drill Company, Inc., Scranton, Pa.

[21] Appl. No.: 907,507

[22] Filed: May 19, 1978

Related U.S. Application Data

[63] Continuation-in-part of Ser. No. 898,687, Apr. 21, 1978, Pat. No. 4,211,294.

[51] Int. Cl.³ .............................................. B23B 27/20

[52] U.S. Cl. .................................... 408/145; 408/204; 407/119; 175/330; 76/108 R

[58] Field of Search ................ 408/145, 204; 407/119; 175/330, 309; 51/206 R, 309 R; 76/101 A, 108 R

[56] References Cited

U.S. PATENT DOCUMENTS

| | | | |
|---|---|---|---|
| 2,607,676 | 8/1952 | Kurtz | 51/309 R |
| 2,712,988 | 7/1955 | Kurtz | 51/309 R |
| 3,127,715 | 4/1964 | Christensen | 175/330 |
| 3,203,774 | 8/1965 | Pratt | 51/206 R |
| 3,372,010 | 3/1968 | Parsons | 51/309 R |
| 3,537,538 | 11/1970 | Generoux | 175/330 |
| 3,640,027 | 2/1972 | Weiss | 51/206 R |
| 3,885,637 | 5/1975 | Veprintsev | 76/108 R |

*Primary Examiner*—Leonidas Vlachos
*Attorney, Agent, or Firm*—1; LeBlanc, Nolan, Shur & Nies

[57] ABSTRACT

An impregnated diamond drill bit having a generally cylindrical, hollow crown structure with a lower portion containing diamond particles and a steel shank attached to the crown structure at its upper end. The diamond particles are dispersed within a metal matrix in the lower portion of the crown. Around both the outside circumferential wall and the inside circumferential wall of portions of the crown structure, there are layers of a highly wear resistant material. These layers are formed of a material that is more wear resistant than the material used for the metal matrix in which the diamond particles are dispersed.

9 Claims, 4 Drawing Figures

IMPREGNATED DIAMOND DRILL BIT CONSTRUCTION

RELATED APPLICATION

The present application is a continuation-in-part application of application Ser. No. 898,687, filed Apr. 21, 1978 and now Pat. No. 4,211,294 and entitled Impregnated Diamond Drill Bit. The subject matter of that prior application is hereby incorporated by reference.

BACKGROUND OF THE PRESENT INVENTION

The present invention relates to impregnated diamond drill bits. Prior to the development of the invention disclosed in the above noted application, the entire crown structure of impregnated diamond drill bits were formed using a single metal matrix composition, which composition had a fairly high degree of hardness. The matrix material on the lower face of the crown structure had to be capable of wearing away in order to expose new cutting surfaces of the diamond particles. Since the same composition was used for the entire metal matrix, both the outside and inside side walls of the crown structure also had a tendency to erode during utilization of the drill. Such erosion in the formation of the drill bit construction actually changes the size and shape of the core being drilled. Furthermore, the portions of the walls which do erode away can impede the water circulation that travels across the surface of the crown structure and through the hollow center of the drill.

The above noted drawback becomes even more pronounced when using a metal matrix structure having a lower degree of hardness, such as on the order of 10 Rockwell C, as disclosed in the above noted application. The problem becomes especially significant where the material in which the drill is being used is extremely hard and abrasive.

In order to overcome these problems, it has been the practice to place surface set diamond particles in both portions of the inner and outer circumferential surfaces of the bit. Such surface set diamonds help to maintain the gauge of the bit by preventing erosion in those areas. While limiting the amount of erosion, the use of such surface set diamonds does not completely avoid the above-described difficulties. Furthermore, the use of such surface set diamonds provides an additional expense both for the cost of the diamond particles and for the cost of hand-setting those diamond particles in the mold when forming the impregnated bit.

SUMMARY OF THE PRESENT INVENTION

An object of the present invention is to provide an improved impregnated diamond drill bit that does not suffer the drawbacks of prior drill bits as discussed above.

Another object of the present invention is to provide an impregnated diamond drill bit in which the inner and outer circumferential surfaces of the bit are less subject to erosion during use of the bit.

A further object of the present invention is to provide an impregnated diamond drill bit that has its inside and outside circumferential surfaces formed of a material that is highly wear resistant. The crown structure of the drill bit is a hollow cylindrical structure. In the lower portion of this structure, the diamond particles are dispersed within a metal matrix thereby in essence forming the impregnated diamond section of the bit. The crown structure has at least along a portion of its outside circumferential surface a layer of material that is more wear resistant than the metal matrix. Preferably, a similar layer of the highly wear resistant material is also contained in the crown structure along its inside circumferential surface. Both of these wear resistant layers are continuous layers that are arranged at a location above the portion of the crown structure containing the dispersed diamond particles.

In accordance with the preferred embodiment of the present invention, the diamond particles are dispersed in a metal matrix material having a hardness of less than 10 Rockwell C. This metal matrix is formed from a mixture of primarily titanium carbide and a nickel-manganese alloy. The wear resistant layers that are arranged above the portion of the crown containing the diamond particles is formed of a material that provides a hardness of approximately 20 to 25 Rockwell C. A mixture of tungsten carbide can be used for forming the wear resistant layers. In the space between the inside and outside wear resistant layers, either the same material as the metal matrix can be used or an iron powder. In either case, iron powder should preferably be used as a joint filler between the wear resistant layers and the metal matrix material.

DESCRIPTION OF THE PREFERRED EMBODIMENT

Figure 1:
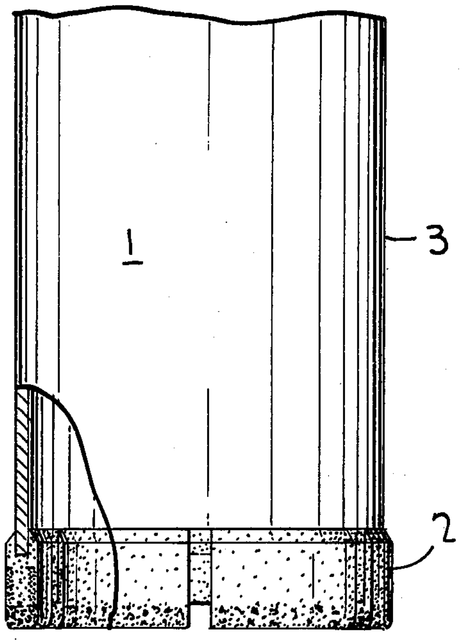
FIG. 1 is a side elevational view of a portion of an impregnated diamond drill bit, with a section cut away.
Figure 2:
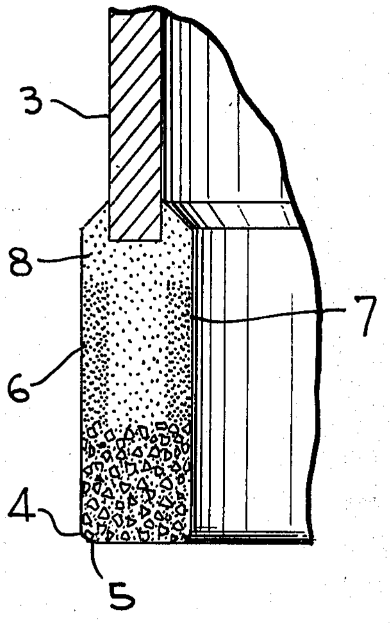
FIG. 2 is an enlarged view of the portion of the drill bit of FIG. 1 that has been cut away so as to provide a sectional view of the bit.

As shown in FIG. 1, an impregnated diamond drill bit 1 has a crown structure 2 and a steel shank 3 attached to a top end of the crown structure. The diamond particles 4 are dispersed within a meal matrix material 5 in a lower portion of crown 2, as shown in FIG. 2.

Above the portion of crown 2 that contains the dispersed diamonds, there is an outside layer 6 and an inside layer 7 extending along the respective circumferential surfaces around the entire cylindrical structure of crown 2. Layers 6 and 7 are formed of a material that is more wear resistant than the material used for forming metal matrix 5. The space between layers 6 and 7 can be filled either with the same material as the metal matrix or an iron powder. In either case, iron powder is used at each location at which the wear resistant material is arranged adjacent to the material of the metal matrix.

The metal matrix is formed from a mixture of titanium carbide and a nickel-manganese alloy. It is also possible to use a small percentage of iron powder within the mixture for the metal matrix.

Layers 6 and 7 are preferably formed from powder rings of tungsten carbide powder, although other materials having a hardness within the desired range of 20 to 25 Rockwell C can be utilized. In order to arrange the wear resistant layers in place, the tungsten carbide powder can be mixed with a small amount of epoxy resin dissolved in dibutyl phthlate. The mixture is then mechanically positioned within the mold as explained below.

Figure 3:
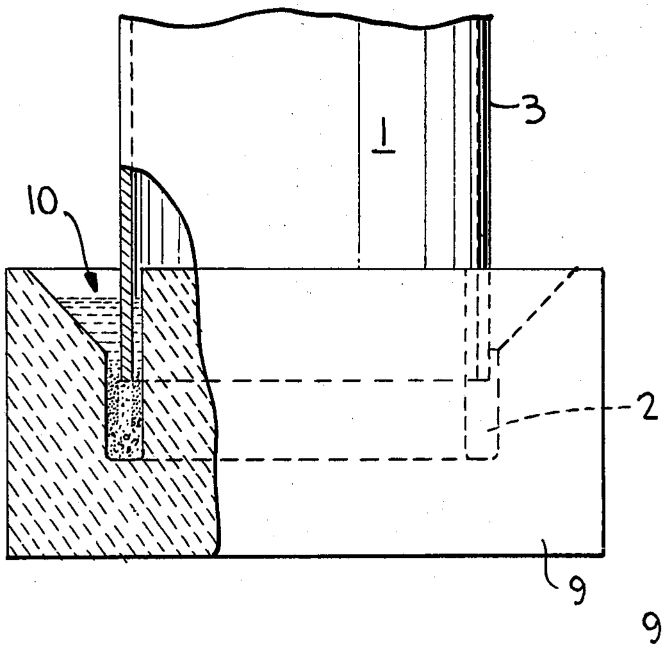
FIG. 3 provides an illustrative view of a technique for making the drill bit illustrated in FIG. 1.
Figure 4:
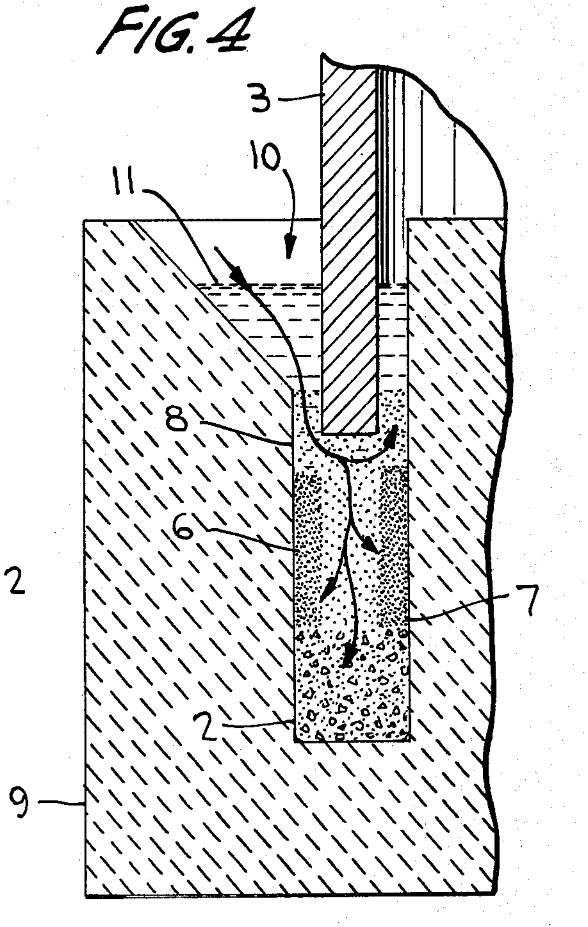
FIG. 4 is an enlarged view of the cut-away section illustrated in FIG. 3.

In constructing the impregnated diamond drill bit of the present invention, a procedure similar to that used in forming prior art impregnated diamond drill bits can be applied. As illustrated in FIG. 3, the diamond particles 4 are dispersed within metal matrix 5 and arranged within a graphite mold 9. Ideally, the diamond particles should be dispersed as evenly as possible within the metal matrix. After the opening in the graphite mold has been partially filled with the metal matrix and diamond particles, wear resistant layers 6 and 7 are put into place. This can be done by taking a thin sheet of metal and arranging it within the opening in the mold so as to form a space for each of layers 6 and 7. The tungsten carbide mixture with the epoxy resin is then poured into the space and pressed against the sides of the mold.

After layers 6 and 7 are put into place, the space between those layers is filled with either an iron powder, or the same material as the metal matrix. The iron powder serves as a joint filler and helps to separate and maintain the position of the wear resistant rings and improve the bonding of the crown with steel shank 3. Next, the steel shank is inserted into the mold. Since the iron powder is more permeable than the tungsten carbide or the titanium carbide and nickel-manganese alloy mixture, it provides an ideal channel for the flow of the infiltrating solder that is used in the sintering process for completing the crown structure. Finally the soldering material 11 is poured in through channel 10 and flows into the portion of mold 9 that contains the various components of the crown structure. Upon cooling, the mold is removed and the diamond drill bit is completed.

It is noted that the above description and the accompanying drawings are provided merely to present exemplary embodiments of the present invention and that additional modifications of such embodiments are possible within the scope of this invention without deviating from the spirit thereof.

I claim:

1. An impregnated diamond drill bit comprising: a generally cylindrical crown structure having a lower portion forming a cutting surface, said lower portion containing diamond particles randomly dispersed within a metal matrix and said crown structure having outside continuous sections formed by a layer of a material that is more wear resistant than said metal matrix, said outside layer lying outside of a central core section of said crown structure and being arranged above said cutting surface portion along portions of the circumferential side wall of said crown structure between water pathways in said crown structure, the thickness of said outside layer being only a small fraction of the thickness of said crown structure; and a shank member attached to said crown structure at its upper end.

2. An impregnated diamond drill bit as defined in claim 1 wherein said crown structure is hollow and has an inside layer of a material that is more wear resistant than said metal matrix, said inside layer is arranged above said cutting surface along a portion of its inside circumferential side walls.

3. An impregnated diamond drill bit as defined in claim 2 wherein said wear resistant layers are located above said lower portion containing said diamond particles of said crown structure and each is formed as a layer around said outside and inside side walls, respectively.

4. An impregnated diamond drill bit as defined in claim 3 wherein said metal matrix in said lower portion of said crown structure has a hardness of less than 20 Rockwell C and said wear resistant layers are formed from a metallic composition having a hardness of approximately 20 to 25 Rockwell C.

5. An impregnated diamond drill bit as defined in claim 4 wherein the hardness of said metal matrix of said lower portion is less than 10 Rockwell C.

6. An impregnated diamond drill bit as defined in claim 5 wherein said metal matrix of said lower portion is formed from a mixture of primarily titanium carbide and a nickel-manganese alloy.

7. An impregnated diamond drill bit as defined in claim 6 wherein said wear resistant layers are formed of primarily tungsten carbide.

8. An impregnated diamond drill bit as defined in claim 7 wherein the portion of said crown structure between said inside and outside wear resistant layers is formed from a mixture of primarily titanium carbide and a nickel-manganese alloy.

9. An impregnated diamond drill bit as defined in claim 8 wherein iron powder is used as a joint filler between said wear resistant layers and said portion of said crown structure between said wear resistant layers.

* * * * *